Nov. 18, 1941.   C. W. STAFFORD   2,263,402
TEMPERATURE-RESPONSIVE MEANS
Filed April 29, 1940   2 Sheets-Sheet 1
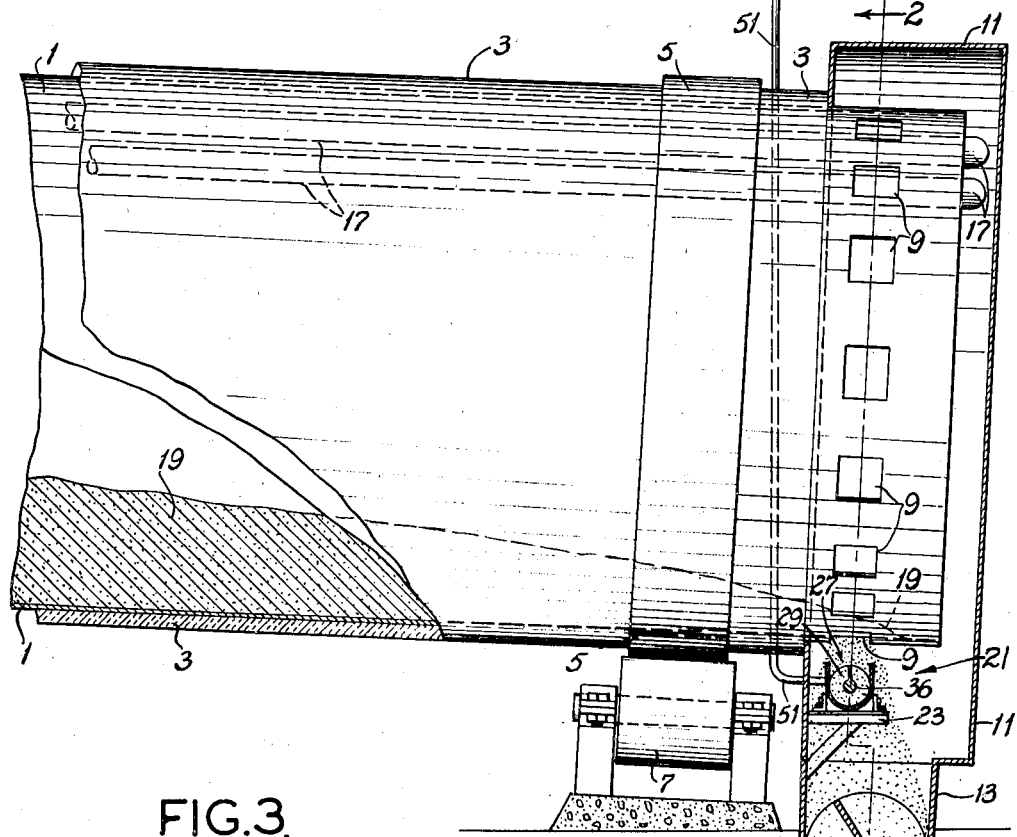
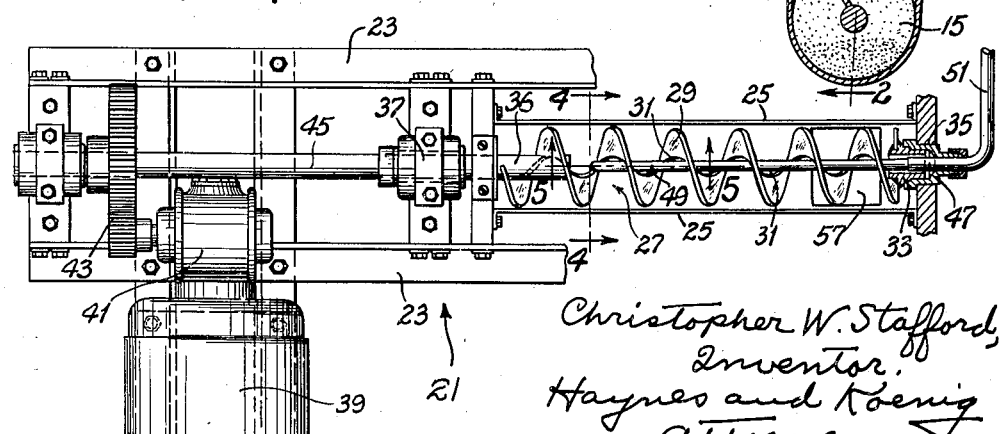

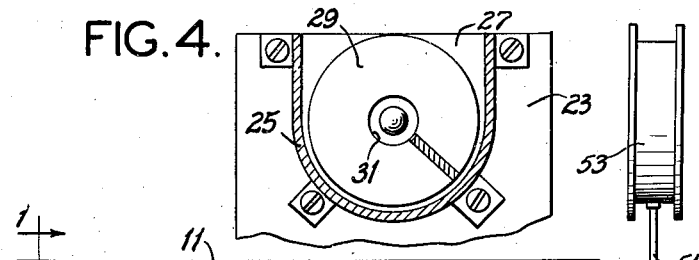
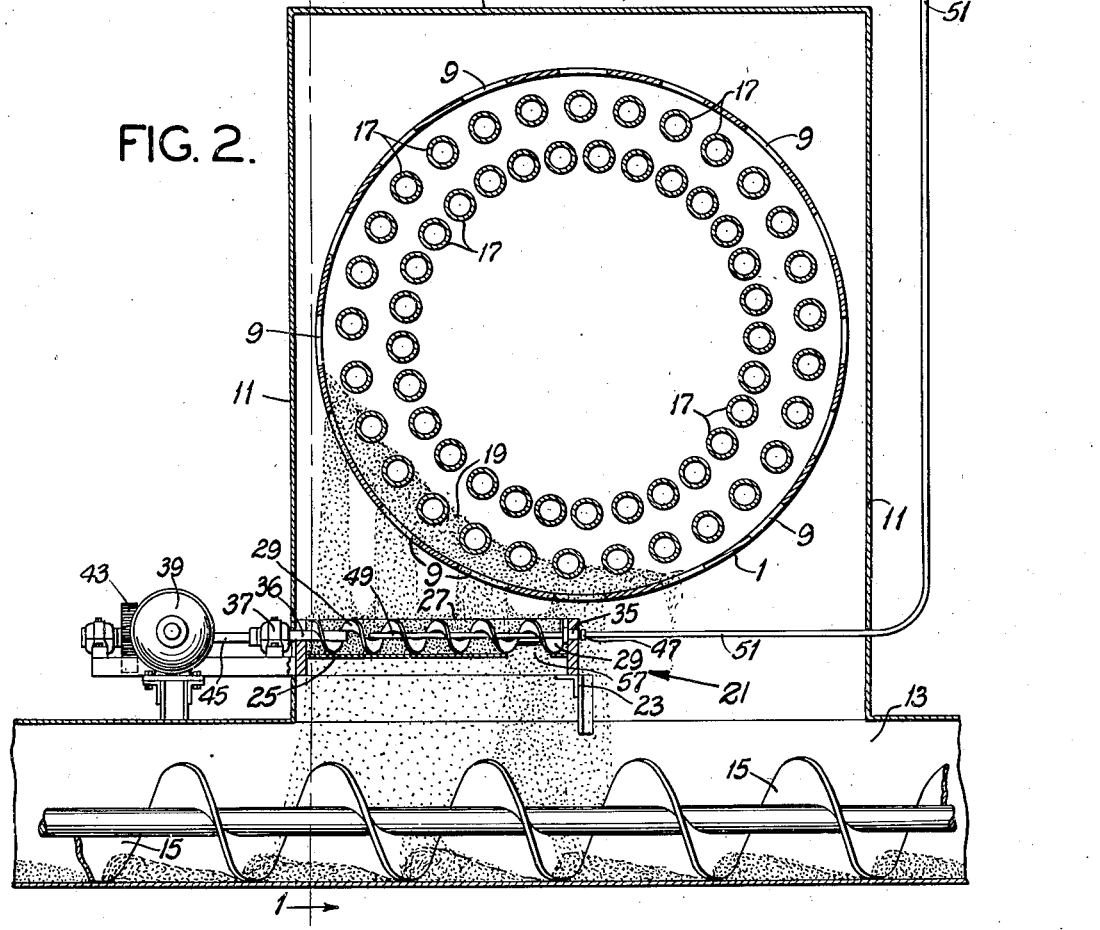
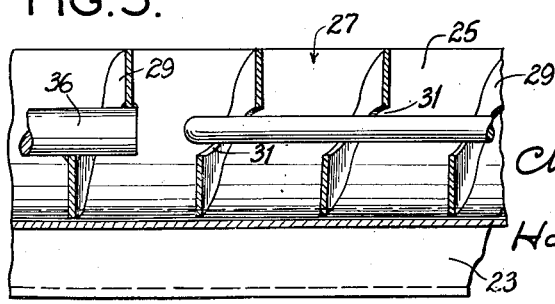

Patented Nov. 18, 1941

2,263,402

UNITED STATES PATENT OFFICE 2,263,402

TEMPERATURE-RESPONSIVE MEANS

Christopher W. Stafford, Kirkwood, Mo.

Application April 29, 1940, Serial No. 332,408

8 Claims. (Cl. 73—351)

This invention relates to temperature-responsive means, and with regard to certain more specific features, to means for determining temperatures of finely divided materials.

Among the several objects of the invention may be noted the provision of means for accurately determining temperatures of samples of finely divided materials, such as for example flowing grain which is dried by aerifying; the provision of such means which affords a continuous sampling process so that temperature reading may be continuously recorded or used for control purposes, as desired; and the provision of apparatus of the class described which is highly accurate for all flow conditions of materials of various comminuted consistencies, such as flocculent, granular or powdery materials. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a diagrammatic side elevation, parts being broken away, showing the application of the invention to a grain drier, and being taken substantially on line 1—1 of Fig. 2;

Fig. 2 is a cross section taken substantially on line 2—2 of Fig. 1;

Fig. 3 is a detail plan view of the sampling and temperature responsive apparatus per se;

Fig. 4 is an enlarged cross section taken on line 4—4 of Fig. 3; and,

Fig. 5 is an enlarged longitudinal section taken on line 5—5 of Fig. 3.

Similar reference characters indicate corresponding parts throughout the several views of the drawings.

Finely divided materials of various kinds pass through various industrial processes by flowing from region to region, and in many instances it is desirable to obtain accurate information as to temperature at one or more points in a process, as for example in a grain drying process. Simply to insert a thermometer into the flowing material has been found to be unsatisfactory because of the transitory character of the contact between thermometer and material. This introduces inaccuracies due to the large amount of contact by air with the thermometer. Furthermore, such mere insertion provides a poor sampling process, the thermometer in this way being responsive to such a small volume of material. Another difficulty has been that the contact area between material and thermometer has been of a low value, particularly where the thermometer is thrust into a loose flow in which there may be considerable air entrainment. Movement of material laterally of the thermometer stem also presents a breakage hazard which the present invention avoids.

Referring now more particularly to Fig. 1, there is shown, for example, a sloping rotary drier drum 1, jacket insulated as at 3, which through a bearing rim 5 is supported for rotation upon trunnion support means 7.

The end of the drier is peripherally perforated with openings 9, and extends into an enclosure 11. The lower part of the enclosure is connected with a main conveyor consisting of a conveyor trough in which is a conveyor screw 15. One or more driers of this type may deliver to a single conveyor, the material being moved to storage, at the right (not shown) in Fig. 2.

In the present example, the drier 1 is shown as being provided with steam heating coils 17, only a portion of which is shown in Fig. 1 for purposes of clarity. It will be understood that other forms of coils may be used, or that hot air, waste heat, electric or other drying means may be employed.

Grain 19 is fed in (Fig. 1) at the left end of the drum (not shown), and as the drum rotates this grain feeds from left to right in Fig. 1, while being rolled, until it traverses the openings 9, through which it falls by gravity flow into the conveyor trough 13 (Figs. 1 and 2) whence it is conveyed by the conveyor screw 15.

For information, and sometimes for control purposes, the temperature is desired of the grain as it falls from the drum 1 into the trough 13. In order to obtain this temperature without the disabilities above mentioned, I employ the grain sampling apparatus shown in general by numeral 21 (Fig. 3). This apparatus consists in a supporting frame 23 by means of which a sampling trough 25 is supported in proper sampling position between the outlets 9 and the drum 1 and screw conveyor 15. Thus, it is in a free gravity fall or flow of grain. The sampling trough or sump 25 has a semi-circular bottom and a longitudinal upstream opening 27.

At numeral 29 is shown a conveyor screw in the trough 25. This is axially hollow, as indicated at 31. This screw is supported at its right end upon a hollow trunnion 33 which rotates in a bearing 35. At its left end, the screw is fastened to a solid rotary trunnion 36 supported in a bearing 37. Attachment to the trunnions is by welding, for example. The screw is driven from a motor 39 through a worm reduction gear 41, a spur reduction gear 43, and drive shaft 45, upon which is supported the trunnion 35. Other driving means may be used. Thus, the hollow screw 29 is rotated in a direction slowly to feed grain in the sampling trough 25 from left to right.

As stated, the screw 29 is axially hollow at 31. So also is the trunnion 33 hollow. This is for the introduction through a stationary gland 47 of a cylindric thermometer bulb constituting a temperature-responsive element 49. This element 49 may be in any conventional gaseous, liquid, vapor or mercury tube-type of temperature recording system. Or, the element 49 may be the covering case of a thermo-couple in a potentiometric system, or the covering case of a bi-metallic switch control element.

Connected to the element 49 is instrument tubing 51 which conveys the response from the bulb 49 to what is shown by way of example as a continuous recorder 53. It will be understood that the responsive element 55 of this recorder may graphically record the history of the temperature, or it may be associated with control apparatus for controlling the heat delivered to the drum 1 or simply indicate flowing temperature.

At the right-hand end of the sampling trough 25 is a downstream outlet 57. The sampling screw 29 is driven slowly enough that falling grain will gather in the sampling trough 25 to a level near its upper edge and spill over, thus the screw 29 causes the grain to move slowly along in a solid mass toward the opening 57. Thus this mass of grain is in solid contact with the sensitive element 49, for a long enough time that an accurate response is obtained. Furthermore, the sensitive thermometer element 49 is protected against breakage by lateral force, being in a flow of grain which is axial instead of transverse.

The method of drying the grain is exemplary, and the invention is applicable to other methods. In any event, in order for grain to pile up to the top of the trough 25, it is necessary for its rate of entry through the upstream opening 27 to be faster than the rate of exit through the downstream opening 57; otherwise, it will not build up level in the trough. However, if it be presumed that the level has intially been built up, then the level may be maintained by a rate of entry which is about equal to the rate of exit.

It will be seen that the invention provides means for continuously, accurately determining temperatures in a flow of finely divided material which permits of an accurate registry of temperatures, and, if desired, the continuous accurate operation of any associated controls or the like. The same principles apply also to application of similar materials to other sensitive elements.

In view of the above, it will be seen that the several objects of the invention are achieved and other advantageous results attained.

As many changes could be made in the above constructions without departing from the scope of the invention, it is intended that all matter contained in the above description or shown in the accomapnying drawings shall be interpreted as illustrative and not in a limiting sense.

I claim:

1. Temperature-responsive apparatus for a continuous stream of finely divided material comprising a sump having an opening upstream and placed in the flow to catch a supply of material, said sump having an outlet to permit return of the caught material back to the flow, a cylindrical temperature-responsive bulb in the sump, and means to move material in the sump axially with respect to and around said bulb.

2. Temperature-responsive apparatus for a continuous stream of finely divided material comprising a sump having an opening upstream and placed in the flow to catch a supply of material, said sump having an outlet to permit movement of the caught material back to the flow, temperature-responsive means in the sump, and means to move material in the sump over and around said responsive means at a rate slower than the flow of the stream past the sump.

3. Temperature-responsive apparatus for finely divided materials, comprising a sampling trough, the axis of which is located generally across the flow of material and having an axial opening directed upstream, a temperature-sensitive element located axially in the trough, and moving means substantially surrounding said element adapted to move said material from one end of the trough to the other, the last-named end having a gravity outlet.

4. Temperature-responsive apparatus for finely divided materials, comprising a sampling trough, the axis of which is located generally across the flow of the material and having an axial opening directed upstream, a temperature-sensitive element located axially in the trough, and rotary helical means substantially surrounding said element and effecting material movement axially from one end of the trough to the other, the trough having a gravity outlet.

5. Temperature-responsive apparatus for finely divided materials, comprising a sampling trough, the axis of which is located generally across the flow of the material and having an opening directed upstream, a temperature-sensitive element located axially in the trough, and means substantially surrounding said element and effecting movement of material from one end of the trough to the other end, the last-named end having a gravity outlet, the rate of movement toward the outlet being such that the flowing material fills the trough and surrounds the sensitive element.

6. Temperature-responsive apparatus for finely divided flowing materials, comprising a sampling trough having a substantially closed bottom with an outlet at one end, and having an opening along the top exposed upstream in the material, a stationary temperature-sensitive element located axially in the trough, and a rotary helix surrounding said element and having an axial opening accommodating the element.

7. Temperature-responsive apparatus for comminuted flowing material comprising an elongate trough having an elongated opening directed upstream of the flow and a relatively limited outlet opening, a temperature-responsive element located longitudinally in said trough, and means for moving material along the trough to the outlet opening, the upstream opening being adapted to receive grain at a rate faster than material moves from the outlet, said moving means being operable at a rate such that the trough is maintained full to an elevation above the temperature-responsive element.

8. Continuously responsive apparatus comprising a member adapted to be placed in a flow of comminuted materials, said member having a bottom enclosure and an upstream opening and an outlet for escape of materials downstream, a temperature-responsive element in said container, the rate of entry of the material exceeding the rate of exist, and means for moving said material from the entry to the exit over the responsive element in such a way that said element is substantially covered.

CHRISTOPHER W. STAFFORD.